March 22, 1960    R. H. KLETT    2,929,349
TRAFFIC DIVERTER
Filed May 6, 1955
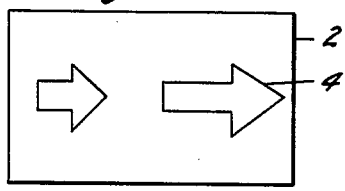
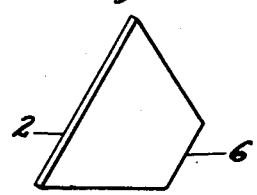
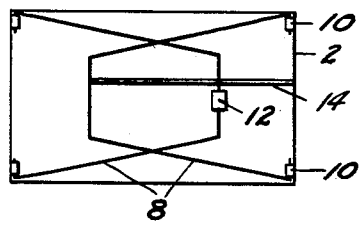
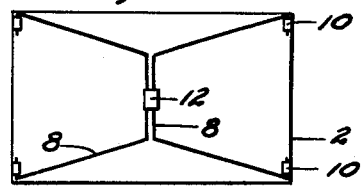
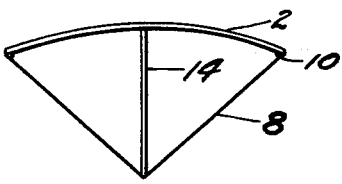
INVENTOR.
Robert H. Klett
BY
Davis Hoxie & Faithfull
ATTORNEYS

2,929,349

TRAFFIC DIVERTER

Robert H. Klett, Yonkers, N.Y.

Application May 6, 1955, Serial No. 506,511

2 Claims. (Cl. 116—63)

This invention relates to disaster indicators and more specifically to portable, reversible disaster indicators.

It is a well known fact that one of the hazards on motor highways is the parked or disabled vehicle. Motor vehicle statutes recognize this problem and attempt its solution by requiring the driver of such disabled car or truck to place warning flares and lights at a given distance behind his vehicle. This procedure however requires the carrying of bulky and costly lights, flares, etc. which aside from expense and space requirements are not adaptable to ordinary passenger vehicles.

It is a purpose of this invention to provide a safety device for automobiles and trucks which may be placed about 100 feet or so in front or back of the disabled vehicle to warn approaching drivers, and to provide such a disaster indicator which may be easily assembled or collapsed for storage.

It is a further purpose of this invention to provide a disaster indicator which is inexpensive to manufacture, has long life and operates both at night as well as in daylight.

Other purposes and objects of this invention will be apparent from the following disclosure, wherein Fig. 1 is a front view of the disaster indicator;

Fig. 2 is a side view of the disaster indicator, in operating position;

Fig. 3 is a back view of the disaster indicator in closed position;

Fig. 4 is a back view of the disaster indicator in operating position; and

Fig. 5 is a top view of the disaster indicator, in operating position.

Referring to the drawings, the disaster indicator consists of a surface 2, indicating means 4 attached thereto, and supporting means 6 to maintain the surface 2 in an upright or slightly inclined position when in operation.

Considering Fig. 1, the indicating means 4 attached to the surface 2 are luminous tape which insures that the oncoming motorist will see the information to be conveyed whether it be day or night. The information shown in Fig. 1 is that the oncoming driver should bear right in order to avoid the disabled vehicle ahead. It should be understood that any other information may be conveyed to the oncoming driver, such as "Stop," "Detour," etc., but for the ordinary passenger vehicle a disaster indicator with the information illustrated is the best since by merely turning it over the driver of the disabled vehicle can direct traffic into another lane as he chooses. The color scheme of the surface 2 and the indicating means 4 is to be in accordance with standard safety regulations as, for example, a white surface with red indicating means.

Considering Fig. 2, the disaster indicator in operating position is supported by means 6 of geometric configuration, shown here as trapezoidal, to provide strong support to keep the surface 2 in its operating position, and slightly inclined so that the disaster indicator will point upwards to the oncoming motorist or be approximately perpendicular to headlights of such oncoming motorist and further to shift the center of gravity into the open unit thus insuring that it will not fall over by reason of wind or backdrafts of passing vehicles. The supporting means 6 are of any suitable material such as heavy wire, etc.

Considering Fig. 3, the supporting means 6 are twin symmetrical brackets 8 pivotally attached to the back of the surface 2 in pivots 10, so that they may lie flat and overlapping as in Fig. 3, when not in use, thus requiring a minimum of storage space, or adjacent one another as in Fig. 4, when the disaster indicator is assembled. Locking means 12, such as a hook clasp, etc. is attached to the outer edge of one of the twin brackets 8 and which will hold the other twin bracket 8 when the disaster indicator is assembled, thus preventing its collapsing for lack of support.

Another embodiment of my invention is illustrated in Fig. 3 and Fig. 5, wherein a rigid bar or arm 14 whose length is longer than the perpendicular distance from the outer edge of the twin brackets 8 in operating position to the back of the surface 2. The rigid bar or arm 14 is firmly attached to the outer edge of the bracket 8 but is free on its other end, so that when the disaster indicator is assembled it may be made to push against the surface 2, bending such surface 2 outward as appears in Fig. 5, thereby lending the entire unit more stability and further by providing a curved surface, allows the headlights of the oncoming motorists to pass over the surface minutely, giving the impression of a moving, pointing indicator and so increases the overall safety features of this invention.

While I have described the preferred embodiments of my invention it should be understood that this disclosure is for the purposes of illustration and that various changes and modifications may be made without departing from the spirit and scope of the invention as set forth in the appended claims.

I claim:

1. A device for diverting traffic comprising a normally plane flexible surface having a front and back face and at least a pair of parallel opposing edges, information on said front face capable of diverting traffic in a certain direction, and support means to support said surface in an upright position on either of its two opposing edges, said support means including a pair of symmetrical brackets pivotally attached to said surface in a manner to fold for storage in overlapped relation into substantially the same plane as said back face and to open for upright support position away from said back face, and a rigid arm having one end connected to the free end of one of said brackets, the other end of said rigid arm being free, said arm being longer than the perpendicular distance from the free end of said one bracket in open position to said back face, said arm being capable of being pushed against said back face to bend said front face away from said arm.

2. A device according to claim 1, wherein the information is in the form of a unidirectional arrow, the axis of said arrow being parallel to said opposing edges.

References Cited in the file of this patent

UNITED STATES PATENTS

| | | |
|---|---|---|
| 352,684 | Feister | Nov. 16, 1886 |
| 1,059,371 | Kelley | Apr. 22, 1913 |
| 1,238,387 | Buck | Aug. 28, 1917 |
| 1,377,065 | Ganley | May 3, 1921 |
| 1,396,724 | Cameron | Nov. 15, 1921 |
| 2,090,157 | Smith | Aug. 17, 1937 |
| 2,164,985 | Cardarelli | July 4, 1939 |
| 2,238,683 | Elliott | Apr. 15, 1941 |
| 2,443,645 | Turan | June 22, 1948 |
| 2,658,295 | Young et al. | Nov. 10, 1953 |
| 2,686,492 | Taylor | Aug. 17, 1954 |
| 2,702,955 | Oliver | Mar. 1, 1955 |